Oct. 20, 1959 W. E. BELL 2,909,725
MAGNETOABSORPTION METHOD AND APPARATUS
Filed July 22, 1955 2 Sheets-Sheet 1
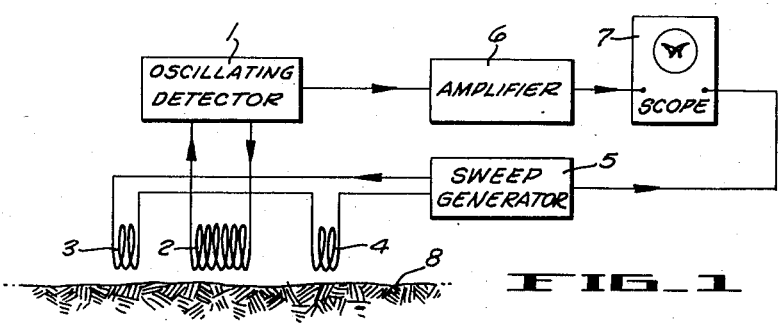
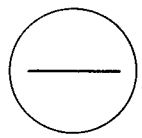
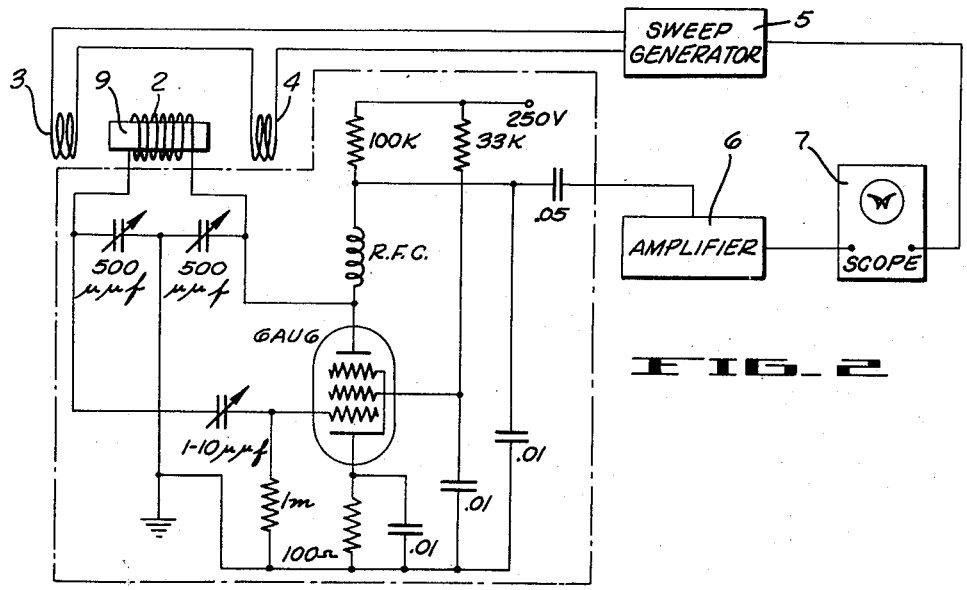
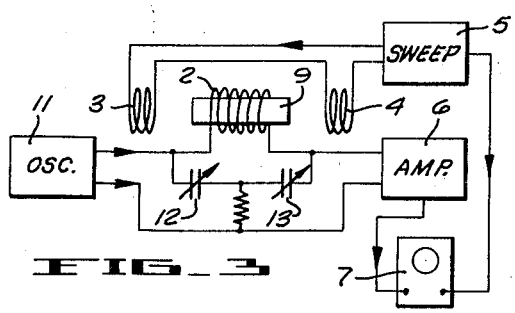
WILLIAM E. BELL
INVENTOR.
BY
ATTORNEYS

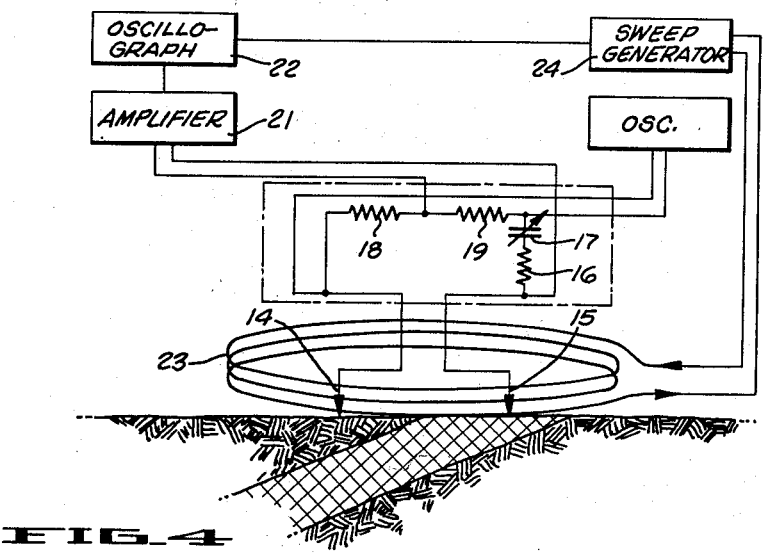
FIG_4
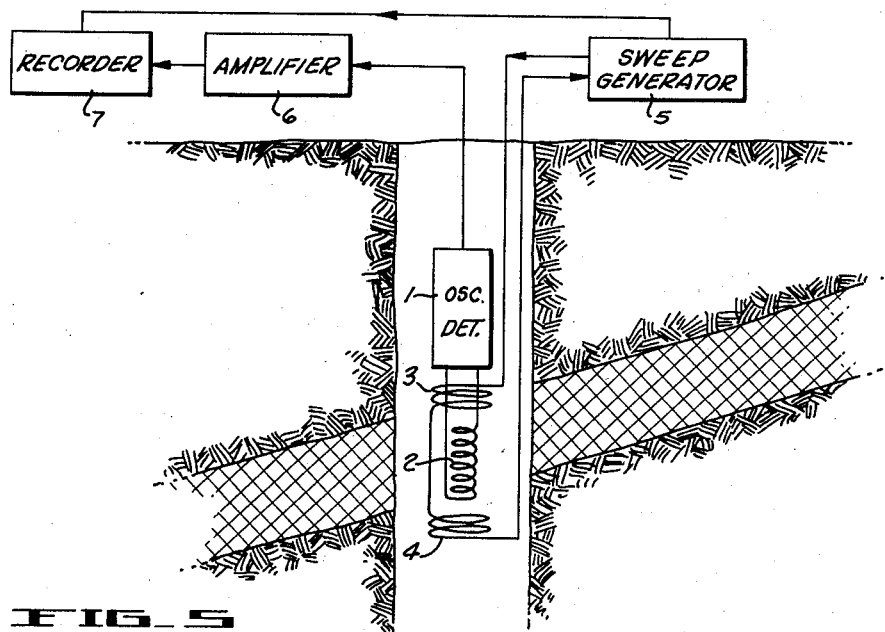
FIG_5
WILLIAM E. BELL
INVENTOR.
BY
ATTORNEY

United States Patent Office 2,909,725
Patented Oct. 20, 1959

2,909,725

MAGNETOABSORPTION METHOD AND APPARATUS

William E. Bell, Palo Alto, Calif., assignor to Varian Associates, San Carlos, Calif., a corporation of California Application July 22, 1955, Serial No. 523,738

7 Claims. (Cl. 324—34)

This invention relates in general to electromagnetic phenomenon in various materials, principally ferromagnetics, and more particularly to novel methods and apparatus for the detection and measurement of electromagnetic properties in these materials.

There has been known for many years certain magnetic phenomena relating to paramagnetics and ferromagnetics such as, for example, magnetostriction, or the change in the dimensions of a material with a change in the magnetism of the material, and magnetoresistance, or the change in electrical resistance of a material with a change in its magnetism. The present invention involves the utilization of a new property of many materials, i.e., the variation in the absorption of energy by the material, from the source of a high frequency energy applied to the material, with variations in the magnetism of the material. This new phenomena is an extremely sensitive tool in the qualitative and quantitative investigation of ferromagnetics and, in many cases, paramagnetics and diamagnetics, observable indications being obtained in response to the slightest changes in the characteristics or the amount of the material.

This invention involves the application of a high frequency alternating magnetic field to a substance which, for example, is in itself a ferromagnetic material or which contains such material, in which the magnetism is changing, and detecting the absorption of the high frequency energy by the material from the A.C. source as a function of the magnetic change. This new technique may be termed magnetoabsorption.

It is, therefore, the object of the present invention to provide novel methods and apparatus for producing energy absorption by a material from a high frequency source as a function of the magnetism of the material.

One feature of the present invention is the provision of novel methods and apparatus for applying high frequency energy to a material having magnetic properties, and detecting the energy absorbed from the source as a function of the magnetism of the material.

Another feature of the present invention is the provision of novel methods and apparatus for inductively coupling the high frequency energy source to the material without direct physical contact.

Another feature of the present invention is the provision of a novel method and means for applying a high frequency energy to a material from a suitable source, simultaneously applying a changing electromagnetic field to the material to change the magnetism thereof, and detecting the change in the energy absorbed from the high frequency source by the material as a function of the changing magnetism.

Another feature of the present invention resides in the fact that the application of the high radio frequency and the changing electromagnetic field and the detection of the energy changes recited in the immediately preceding feature may be all accomplished by inductive coupling rather than direct contact.

Another feature of the present invention is the provision of a first coil of wire for applying radio frequency energy to a substance or matter coupled to the coil, a further coil apparatus for applying a changing magnetic field to the matter, and detecting apparatus for indicating the radio frequency energy absorbed from the first coil by the substance as a function of the changing magnetic field force.

Still another feature of the present invention is the application of this novel magnetic method and apparaturs to the logging of earth bores by detecting magnetic strata in such bores and for the determination of the magnetic susceptibility in the earth's crust and other earth formations.

These and other features and advantages of the present invention will become more apparent on perusal of the following specification taken in connection with the accompanying drawings wherein Fig. 1 shows in schematic block diagram form a novel magnetoabsorption system which embodies the present invention, Fig. 1A is an oscilloscope trace showing the wave form on the oscilloscope of Fig. 1 before the ferromagnetic or paramagnetic material under investigation is placed in the system, Fig. 1B shows the oscilloscope trace after the sample of material has been placed in the system, Fig. 2 is a partial view of the novel system disclosed in Fig. 1 in which the oscillating detector stage has been shown in a more complete circuit form, Fig. 3 is a schematic diagram of a magnetoabsorption system which utilizes a balanced-T type of bridge circuit employed for detecting the energy absorption by the sample under investigation, Fig. 4 is a schematic diagram of a novel magnetoabsorption system of the present invention which may be utilized in determining the magnetic susceptibility of the earth's crust, Fig. 5 is a magnetoabsorption system which is especially adapted for logging the earth formations in an earth bore to detect formations of magnetic material, Similar reference numerals are utilized in the various figures of the drawings to indicate similar elements.

Referring now to Fig. 1, there is shown a block diagram of one embodiment of the present invention wherein a source of high frequency energy 1, for example, an oscillating detector producing one megacycle, is coupled to a transmitter coil 2 which, for example, may be the coil located in the oscillator tuning circuit. Positioned substantially in alignment with the transmitter coil 2 are a pair of serially connected and similarly wound sweep coils 3 and 4 which are coupled to a sweep generator 5 which, for example, may produce a 60 cycle sweep current. Means are included in the oscillating detector as explained below for preventing direct coupling of the sweep coil to the oscillating detector and thus preventing modulation of the oscillator signal by the sweep voltage. The oscillating detector 1 is also coupled through a radio frequency amplifier 6 to the vertical plates of the oscilloscope 7. The 60 cycle sweep is coupled to the horizontal plates of the oscilloscope.

The oscillating detector is an electronic circuit known in the art, this circuit device producing the high frequency energy in the coil 2, the circuit being extremely sensitive to any changes in the amount of energy absorption from the coil. The output from the oscillating detector to the amplifier 6 is the envelope of the 60 cycle modulated high frequency. Therefore, the wave form on the scope represents the amplitude of the high frequency energy produced by the oscillating detector. A more detailed circuit of one type of oscillating detector is shown in Fig. 2 which will be subsequently described.

Before the transmitter coil 2 and sweep coils 3 and 4 are placed near a ferromagnetic material, the line form on the screen of the oscilloscope 7 is as shown in Fig. 1A. Because direct coupling between the sweep coils and the oscillating detector is eliminated, the radio frequency is unmodulated by the sweep signal. When the transmitter and sweep coils are brought into inductive coupling relationship with the ferromagnetic or paramagnetic material, represented in the present instance by the earth 8, the wave form on the oscilloscope changes immediately to that such as shown in Fig. 1B, this change in wave form resulting from the fact that the ferromagnetics in the earth absorb a small amount of energy from the oscillating detector circuit thus resulting in a decrease in the amplitude of the wave form. The wave form shown is very similar to the hysteresis type curve of resistivity plotted against field strength for the magnetoresistance effect mentioned above. The amplitude and certain aspects of the shape of the hysteresis type curve shown in Fig. 1B will take various forms dependent on the exact material under investigation; for example, the amplitude of the curve will be very much greater for a piece of iron than for an insulating material such as a ceramic which has only a faint trace of a ferromagnetic substance therein.

The changing magnetism of the material which results in the energy absorption signal noted above is believed to be due to one or more of a number of physical effects occurring in the matter. The following listed effects are believed to affect the magnetism and thus the absorption of energy from the radio frequency source; (1) Changing eddy currents due to changing conductivity as a result of the Hall effect; (2) The effect of "domain flips" on eddy currents due to the fact there are preferred directions for current flow in the electron magnetic moment domains in the material; (3) Ordinary hysteresis generally believed to be delayed flipping of electron magnetic moment domains; (4) Effect of the real part of reversible permeability on skin depth through which eddy currents can flow; (5) Direct energy absorption due to the complex part of the permeability; and (6) The effect of the sweep field in causing the radio frequency hysteresis loops to fail to be closed. It should be noted that it is believed that not all of the above effects are present in all materials. For example, in bismuth it is believed that possibly only the effect (1) listed above may be present. Also, in nonconductive ferromagnetic material, for example, ferrites, it is believed that the prevalent effects are (3), (5) and (6) above. In other materials there is a possibility that all of the above six effects contribute to the absorption phenomenon of this invention. It should be stated that due to the complex nature of the phenomenon, the exact effect causing or producing this magnetoabsorption phenomenon may in subsequent years and after exhaustive studies prove to be due in part to some effect other than those listed above.

The types of material which may be successfully examined in this system are numerous. Although this method is applicable to diamagnetics and paramagnetics, it is, practically speaking, much more useful in the field of ferromagnetics since the latter possess greater magnetic properties. However, some diamagnetics such as bismuth, give a very discernible signal. Also the sensitivity of this method on a diamagnetic or paramagnetic may be increased substantially by changing the temperature of the material to its optimum value. In general, there is an optimum temperature for a maximum signal for any material, diamagnetic, paramagnetic or ferromagnetic. These optimum temperatures are spread over a wide range above and below room temperature. For example, the signal obtained from copper, a diamagnetic, is greatly enhanced when the temperature of the copper is lowered, for example to $-180°$ C.

The inherent sensitivity of a practical, high-sensitivity system of the above type is such that the change in loading on the transmitter coil can be observed to about one part in 25 million, or, in other words, an absorption of as little as one part in 25 million of the energy from the coil is clearly detectable. It can thus be seen that, since a strong ferromagnetic material such as iron changes its complex magnetic susceptibility by the order of 1% with changes in readily attainable field strengths, the signals obtained from many materials will be very large. In regard to this sensitivity, materials which are considered pure insulators such as ceramics when examined by this particular magnetoabsorption system will give a very discernible signal indicating that they possess a minute trace of ferromagnetic material. Various types of rocks will record a discernible signal. A further understanding of the sensitivity of this system can be obtained from the fact that an insect fly inserted in a test tube and placed in the system registered a signal on the oscilloscope.

It should be noted that the material 8 may be within the R.F. coil 2 or it may be placed outside of the coil so long as it is still sufficiently within the zone of influence of the R.F. field and slowly changing or A.C. field.

Referring now to Fig. 2 there is shown one practical embodiment of the system of Fig. 1 for investigating a ferromagnetic substance 9, including an oscillating detector circuit 1 shown in detail. The detector circuit set forth is only one of various known types that may be employed by persons skilled in the art. The coil 2 is a part of the tuned circuit of this oscillator, the circuit values given being suitable for producing approximately a 1 megacycle signal output. A 1–10 $\mu\mu f$. condenser is positioned in the grid circuit of the oscillator to prevent the E.M.F. induced in the radio frequency coil 2 from the sweep coils 3 and 4 from modulating the grid voltage and thus modulating the oscillator output.

There is shown in Fig. 3 another embodiment of the present invention which utilizes a bridge-T type of bridge circuit for use in detecting the energy absorption from the radio frequency coil 2. In use, the sample of matter 9 is placed within or closely adjacent the coil 2 and the radio frequency signal from oscillator 11 applied thereto. The sweep field is not applied to the coils 3 and 4 at first. The condensers 12 and 13 are adjusted so that this bridge-T is in balance and the oscilloscope indicator 7 is at a zero base position. The sweep field is then applied to the coils 3 and 4 from sweep generator 5 and the energy absorption by material 9 is determined by the change in the signal of the scope resulting from the unbalance of the bridge due to the energy absorption by the sample.

There is shown in Fig. 4 a novel method for utilizing the present invention in determining the magnetic susceptibility at various points across the earth's surface. This information regarding magnetic susceptibility is useful in geophysical applications. An A.C. bridge type of detecting system is employed in which one of the arms of the A.C. bridge includes the earth's surface running between a pair of probes 14 and 15 adapted for insertion into the surface. This arm of the A.C. bridge is balanced by the tunable resistor 16 and condenser 17 located in a second arm. The remaining two arms include resistors 18 and 19, respectively. The amplifier 21 is connected across the bridge, the output of the amplifier being coupled to the oscillograph 22 for indicating the balanced or unbalanced condition of the bridge. The bridge is first balanced by means of condenser 17 and resistor 16 with the sweep coil 23 disconnected from the sweep generator 24. After balancing, the sweep coil 23 is energized from the sweep generator 24 and the absorption of power from the bridge by the earth will result in an unbalance of the bridge. This unbalance is indicated by the oscillograph, the amount of unbalance serving to indicate the magnetic susceptibility of the earth between the probes 14 and 15.

Referring now to Fig. 5, there is shown a magnetoabsorption system of the present invention which is adapted to be lowered into a well bore and continually log the bore while it is passing up or down within the well. Should the sensing head including the sweep coils 3 and 4 and radio frequency coil 2 pass a ferromagnetic earth formation which absorbs energy from the coil as a function of the sweeping field, this absorption will be immediately detected and recorded on a suitable permanent recorder.

Another important application of the present invention is its utilization for sorting out different types or classes of materials, which may otherwise appear to be of the same class. For example, different ferromagnetic alloys, although they would appear to be the same, would exhibit different, determinable magnetoabsorption characteristics when tested. Still another utilization would be in inspecting and testing ferromagnetic materials to determine if they have desirable pre-established characteristics or if they meet standards. This invention may also be used to locate objects of ferromagnetic or like material buried beneath the earth's surface.

Since many changes could be made in the above construction of the apparatus involved and other embodiments as well as applications of this invention could be made without departing from the scope thereof, for example, the utilization of detecting means for determining the frequency change in the radio frequency source which results from the absorption of energy from the source as a function of the changing magnetism rather than detecting the energy change in the source, it is intended that all matter contained in the above description or shown in the accompanying drawings shall be interpreted as illustrative and not in a limiting sense.

What is claimed is:

1. Apparatus for investigating the magnetic properties of matter which comprises means for producing a varying magnetic field for penetrating the matter under investigation, means for applying a radio frequency energy to the matter simultaneously with the changing magnetic field and having a substantial magnetic field component in the direction of said changing magnetic field, means coupled to the radio frequency energy means for measuring the absorption of energy therefrom by the matter as a function of the varying electromagnetic field, and means for preventing the direct coupling of a signal due to said varying magnetic field produced by said first means into said radio frequency measuring means whereby said radio frequency measuring means is responsive only to the absorption of energy from said radio frequency source as a function of the changing magnetism of the matter.

2. Apparatus as claimed in claim 1, wherein said measuring means includes a bridge network, one arm of which includes the means for applying the radio frequency energy to the matter.

3. Apparatus for investigating the magnetic properties of matter which comprises a first coil means inductively coupled to said matter, means coupled to said first coil means and supplying a changing current thereto whereby a changing magnetic field is produced penetrating said matter, a second coil means inductively coupled to said matter, a radio frequency energy source coupled to said second coil means for supplying a radio frequency energy thereto whereby a radio frequency field is induced in said matter, the second coil being so positioned relative to the first coil whereby a substantial component of the changing magnetic field is in the same direction of the applied radio frequency energy, detecting means coupled to said radio frequency energy source for detecting the radio frequency energy absorbed from said source as a function of the changing magnetic field, and means coupled to said radio frequency source for preventing direct coupling of a signal into said radio frequency source from said coil means through said second coil means whereby modulation of the radio frequency energy directly in response to the changing current from said first means is prevented.

4. Apparatus as claimed in claim 3, wherein said detecting means comprises a balancing bridge network, one arm of which comprises said second coil.

5. Apparatus for measuring the magnetic characteristics of matter comprising a first coil means, a sweep generator means coupled to said first coil means for supplying a slowly varying energy to said first coil means for producing a slowly varying magnetic field enveloping said matter, said varying magnetic field periodically sweeping through a point of zero field, a second coil means inductively coupled to said matter, an oscillating detector coupled to said second coil means and transmitting thereto a radio frequency energy, said first and second coils being oriented such that substantial components of each of the fields are in the same direction, said oscillating detector detecting energy absorbed by the matter as a function of said slowly varying field, means for preventing the direct coupling of the modulating signal in said first coil means into said oscillating detector whereby said oscillating detector is responsive only to the absorption of energy of said second coil as a function of the changing magnetism of the matter, and indicating means coupled to the oscillating detector for indicating said energy absorption.

6. Apparatus for investigating the magnetic properties of matter in which the magnetism is changing which comprises means for applying a radio frequency magnetic field energy to the matter during said changing magnetism, including a radio frequency coil having its axis extending substantially in the direction of the magnetism of the matter, means coupled to the radio frequency energy means for detecting the absorption of energy from said source by the matter as a function of the varying magnetism of the matter, and means coupled to said first means for preventing a modulation of the radio frequency magnetic field energy directly by a signal induced in said radio frequency coil within the frequency range of the changing magnetism.

7. Apparatus as claimed in claim 6 wherein said means for applying the radio frequency energy to the matter comprises an oscillating detector circuit coupled to said coil.

References Cited in the file of this patent

UNITED STATES PATENTS

| Re. 23,950 | Bloch et al. | Feb. 22, 1955 |
| 2,535,666 | Broding | Dec. 26, 1950 |
| 2,561,489 | Bloch et al. | July 24, 1951 |
| 2,564,777 | Cavanagh | Aug. 21, 1951 |
| 2,589,494 | Hershberger | Mar. 18, 1952 |
| 2,705,790 | Hahn | Apr. 5, 1955 |
| 2,799,823 | Shaw et al. | July 16, 1957 |

FOREIGN PATENTS

| 600,915 | Great Britain | Apr. 22, 1948 |
| 150,333 | Australia | Feb. 27, 1953 |

OTHER REFERENCES

Physical Review, vol. 73, No. 7 (April 1, 1948), pp. 679–712; article by Bloembergen, Purcell and Pound.